US012651435B2

(12) United States Patent
Komatsu et al.

(10) Patent No.: US 12,651,435 B2
(45) Date of Patent: Jun. 9, 2026

(54) IMAGE CLASSIFICATION DEVICE AND IMAGE CLASSIFICATION METHOD

(71) Applicant: Hitachi High-Tech Corporation, Tokyo (JP)

(72) Inventors: Sota Komatsu, Tokyo (JP); Masayoshi Ishikawa, Tokyo (JP); Fumihiro Bekku, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 297 days.

(21) Appl. No.: 18/580,712

(22) PCT Filed: Jul. 30, 2021

(86) PCT No.: PCT/JP2021/028252
§ 371 (c)(1),
(2) Date: Jan. 19, 2024

(87) PCT Pub. No.: WO2023/007693
PCT Pub. Date: Feb. 2, 2023

(65) Prior Publication Data
US 2024/0362892 A1 Oct. 31, 2024

(51) Int. Cl.
*G06V 10/764* (2022.01)
*G06T 3/40* (2006.01)
(Continued)

(52) U.S. Cl.
CPC .............. *G06V 10/764* (2022.01); *G06T 3/40* (2013.01); *G06V 10/44* (2022.01); *G06V 10/762* (2022.01); *G06V 10/771* (2022.01)

(58) Field of Classification Search
CPC .... G06V 10/764; G06V 10/44; G06V 10/762; G06V 10/771; G06V 10/40;
(Continued)

(56) References Cited

U.S. PATENT DOCUMENTS 8,675,974 B2 * 3/2014 Iio ..................... G06F 18/23213
382/190
9,990,687 B1 * 6/2018 Kaufhold ............. G06N 3/0985
(Continued)

FOREIGN PATENT DOCUMENTS

JP        2014-229115 A     12/2014
JP        2019-66993 A       4/2019
(Continued)

OTHER PUBLICATIONS

International Search Report (PCT/ISA/210) issued in PCT Application No. PCT/JP2021/028252 dated Nov. 2, 2021 with English translation (4 pages).
(Continued)

*Primary Examiner* — Atiba O Fitzpatrick
(74) *Attorney, Agent, or Firm* — Crowell & Moring LLP

(57) ABSTRACT

Provided are an image classification device and method that are capable of extracting and mapping an important feature in an image. The image classification device includes: a feature extraction unit 101 that generates a first image group generated by applying different noises to the same image among images included in an image group and a second image group including different images, is trained such that features obtained from the first image group are approximate, is trained such that features obtained from the second image group are more different, and extracts features; a feature mapping unit 102 that maps the extracted plurality of features two-dimensionally or three-dimensionally using manifold learning; and a display unit 103 that displays a mapping result and constructs a training information application task screen.

11 Claims, 6 Drawing Sheets

(51) Int. Cl.

| | |
|---|---|
| *G06V 10/44* | (2022.01) |
| *G06V 10/762* | (2022.01) |
| *G06V 10/771* | (2022.01) |

(58) Field of Classification Search

CPC ........... G06V 10/7788; G06V 10/7715; G06V 10/77; G06V 10/774–7753; G06T 3/40; G06T 7/00; G06T 2207/20081; G06F 18/213; G06F 18/214–2155; G06F 7/023; G06F 40/16; G06N 3/08–0985

See application file for complete search history.

(56) References Cited

U.S. PATENT DOCUMENTS

| | | | | |
|---|---|---|---|---|
| 10,984,075 | B1 * | 4/2021 | Liang | G06V 10/76 |
| 2010/0329529 | A1 * | 12/2010 | Feldman | G06F 18/21375 382/131 |
| 2011/0158535 | A1 * | 6/2011 | Iio | G06F 18/23213 382/190 |
| 2014/0037172 | A1 * | 2/2014 | Madabhushi | G06F 18/2137 382/131 |
| 2016/0132754 | A1 * | 5/2016 | Akhbardeh | G06V 20/52 382/103 |
| 2017/0256068 | A1 * | 9/2017 | Wang | G06T 7/337 |
| 2020/0050825 | A1 * | 2/2020 | Mendoza-Schrock | G06V 20/17 |
| 2020/0380338 | A1 * | 12/2020 | Matsumura | G06F 18/24137 |
| 2021/0042575 | A1 * | 2/2021 | Firner | G05D 1/0088 |
| 2021/0124993 | A1 * | 4/2021 | Singh | G06N 3/09 |
| 2021/0124999 | A1 * | 4/2021 | Dia | G06V 10/7747 |
| 2021/0158104 | A1 * | 5/2021 | Wu | G06V 10/764 |
| 2021/0166052 | A1 * | 6/2021 | Park | G06F 18/214 |
| 2021/0201145 | A1 * | 7/2021 | Pham | B60W 60/001 |
| 2021/0334706 | A1 | 10/2021 | Yamaguchi et al. | |
| 2022/0051402 | A1 * | 2/2022 | Dikici | G06N 3/0464 |
| 2023/0306761 | A1 * | 9/2023 | Sirbulescu | G06V 10/762 |
| 2025/0118057 | A1 | 4/2025 | Daylac et al. | |

FOREIGN PATENT DOCUMENTS

| | | |
|---|---|---|
| JP | 2020-34998 A | 3/2020 |
| KR | 10-2018-0118596 A | 10/2018 |

OTHER PUBLICATIONS

Japanese-language Written Opinion (PCT/ISA/237) issued in PCT Application No. PCT/JP2021/028252 dated Nov. 2, 2021 with English translation (5 pages).

Simard, P. Y. et al.; "Best Practices for Convolutional Neural Networks Applied to Visual Document Analysis", Proceedings of the Seventh International Conference on Document Analysis and Recognition (ICDAR'03), Sep. 8, 2003, pp. 1-6 (6 pages).

Korean-language Office Action issued in Korean Application No. 10-2023-7044265 dated Feb. 11, 2026, with English translation (22 pages).

Chen, T. et al.; "A Simple Framework for Contrastive Learning of Visual Representations", Proceedings of the 37th International Conference on Machine Learning, PMLR 119, Jul. 2020 (20 pages).

Chatzimparmpas, A. et al.; "t-viSNE: Interactive Assessment and Interpretation of t-SNE Projections", IEEE Transactions on Visualization and Computer Graphics, Aug. 2020, pp. 2696-2714, vol. 26, No. 8 (19 pages).

Kandogan, E.; "Just-in-Time Annotation of Clusters, Outliers, and Trends in Point-based Data Visualizations", IEEE Symposium on Visual Analytics Science and Technology, 2012, pp. 73-82 (10 pages).

* cited by examiner

[FIG. 1]
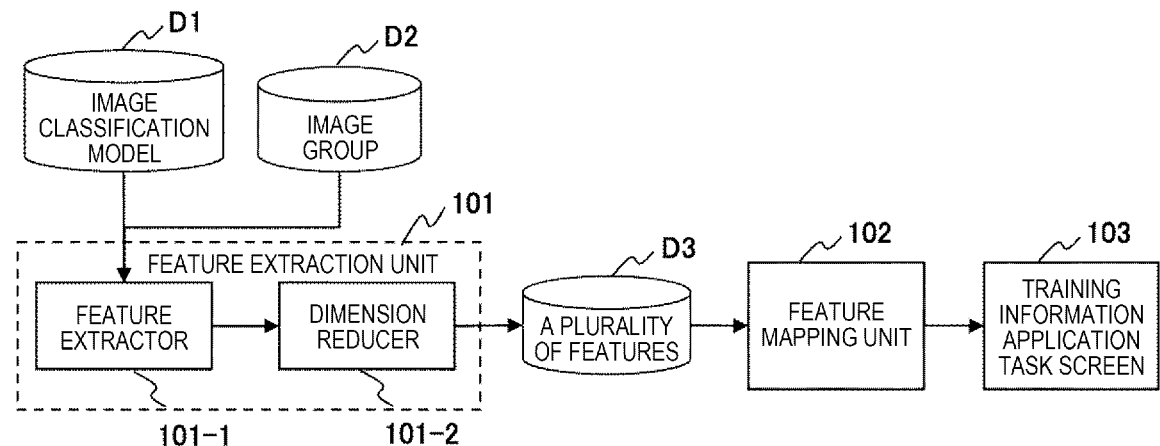
[FIG. 2]
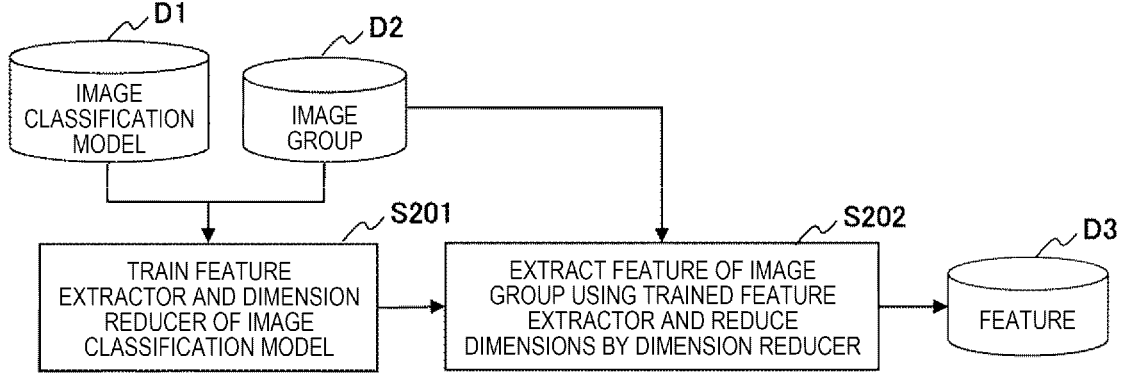

[FIG. 3]
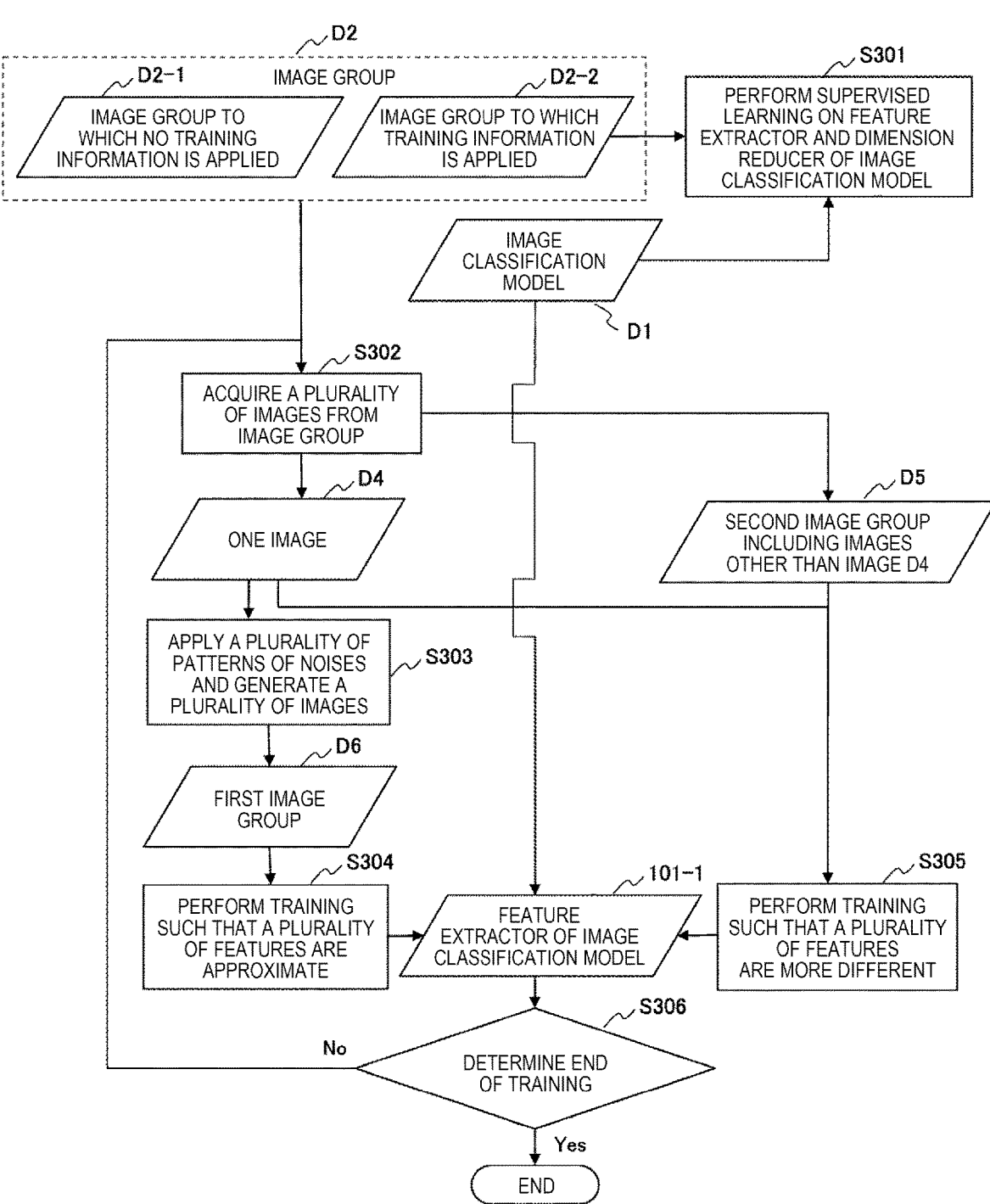

[FIG. 4]
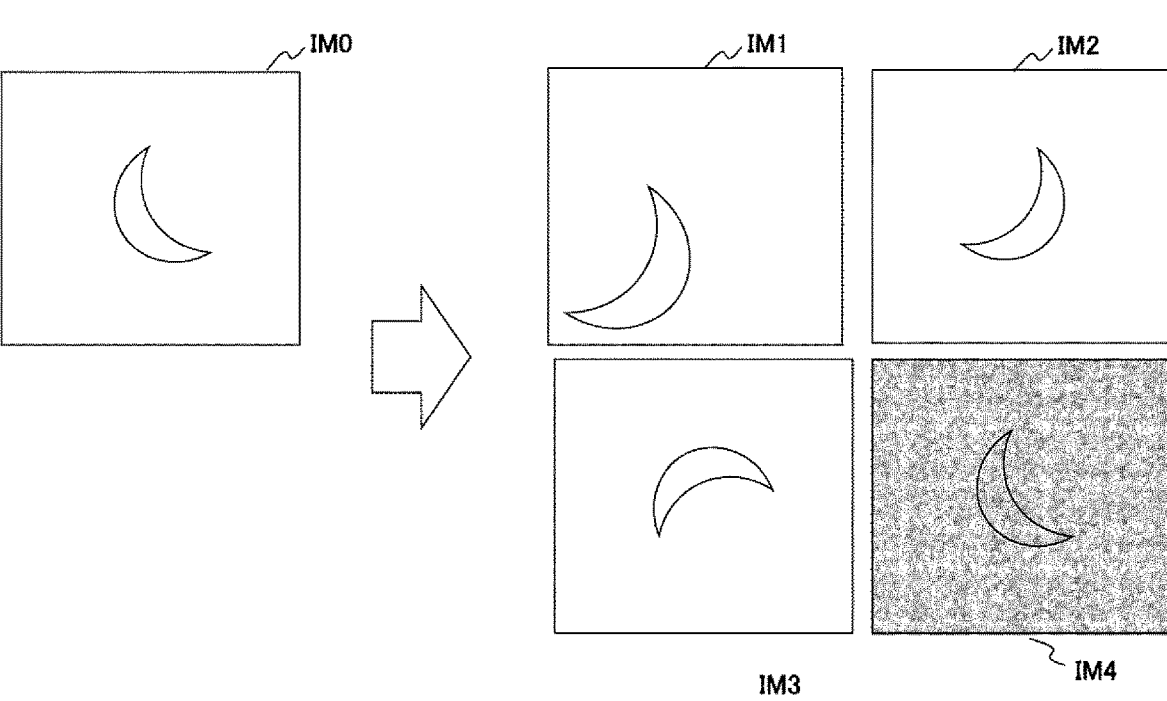
[FIG. 5]
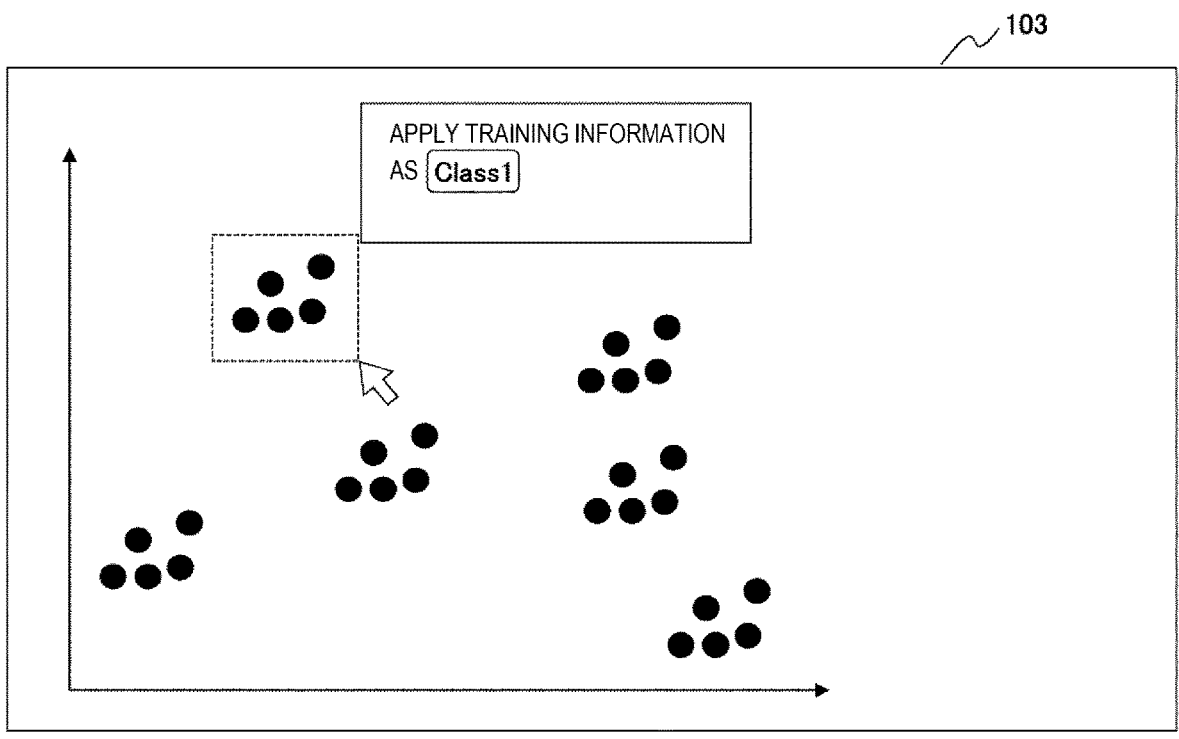

[FIG. 6]
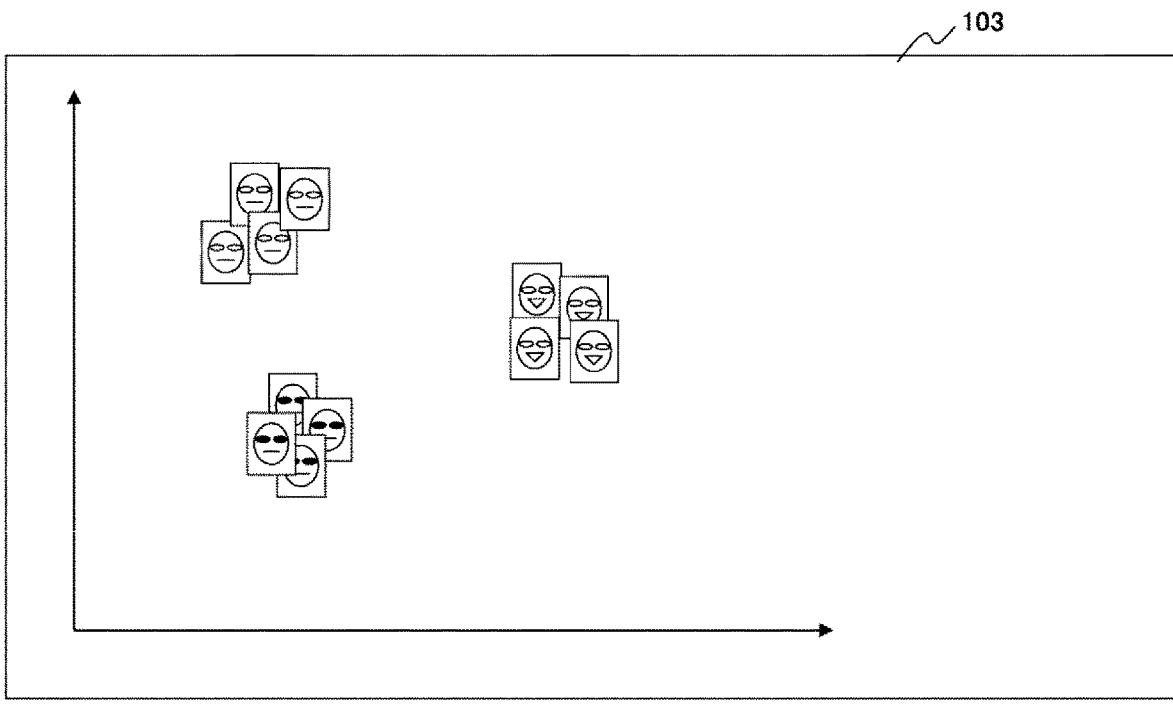
[FIG. 7]
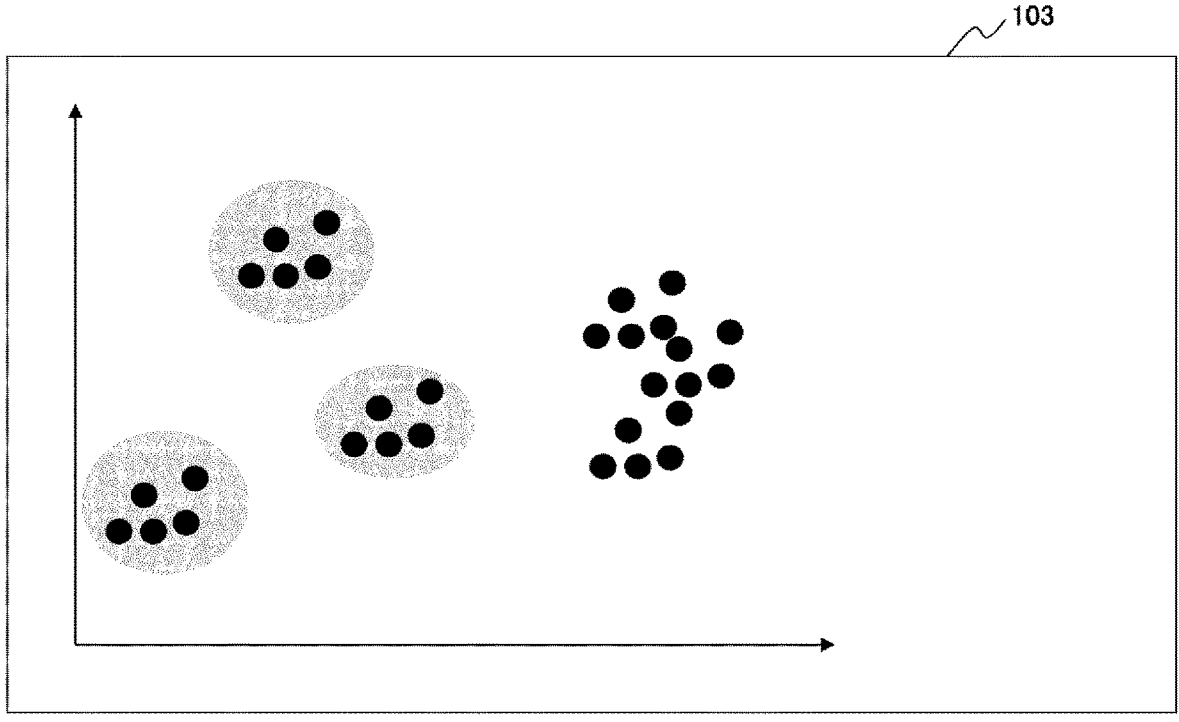

[FIG. 8]
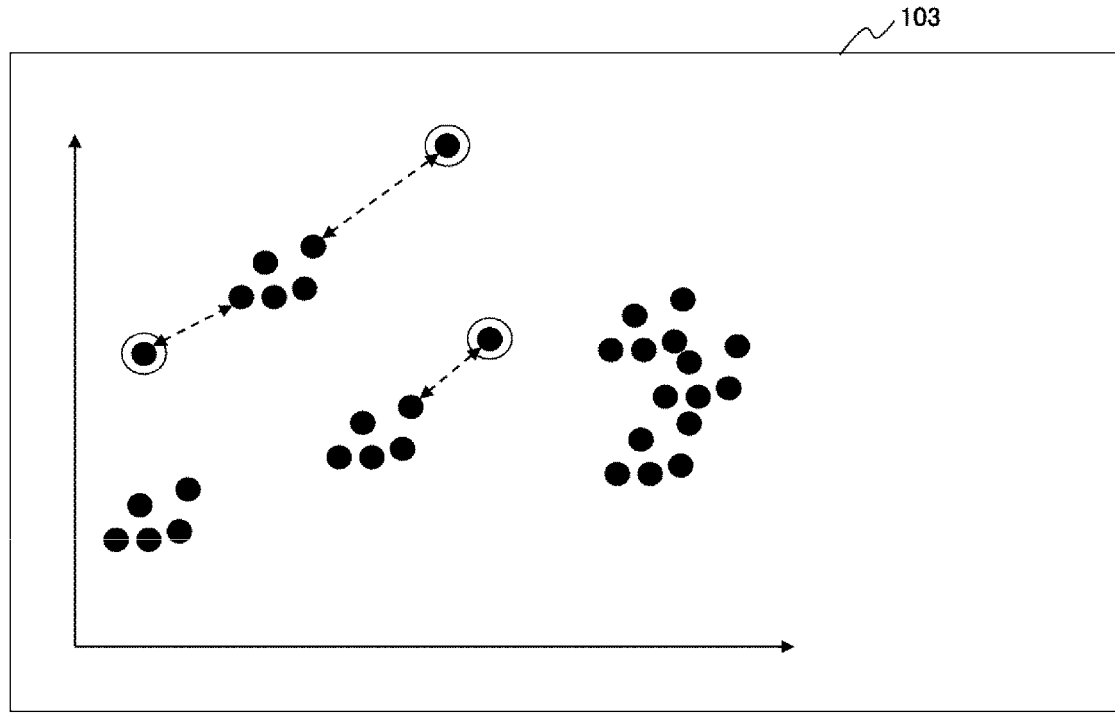
[FIG. 9]
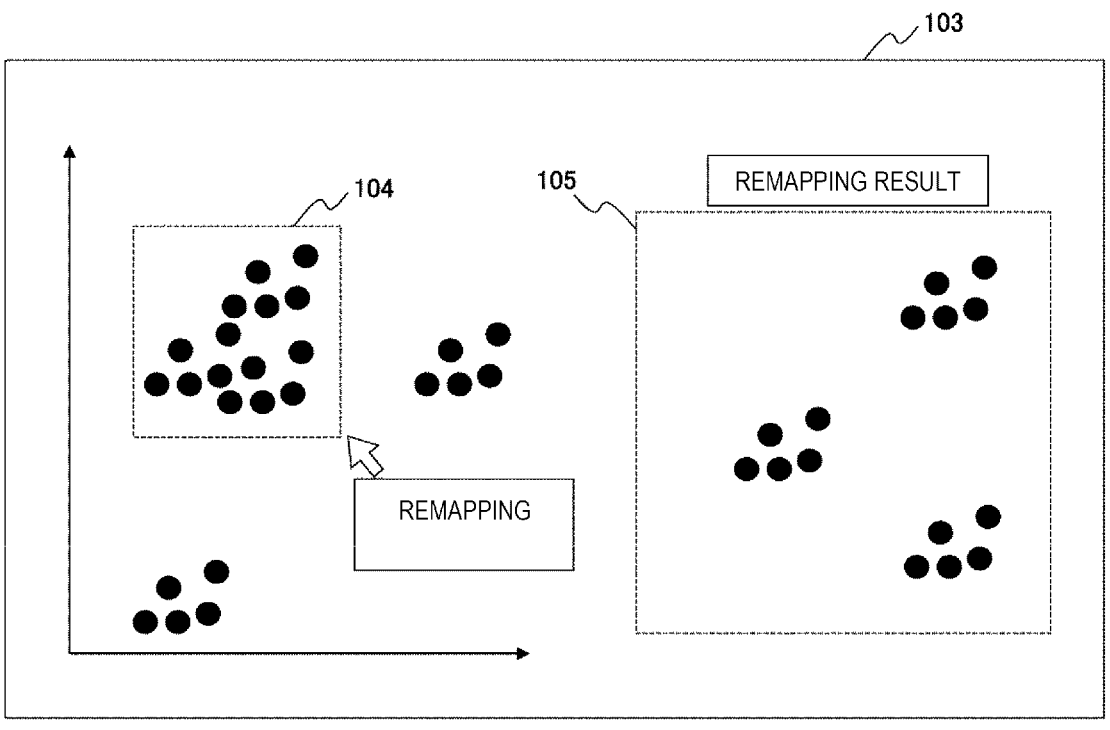

[FIG. 10]
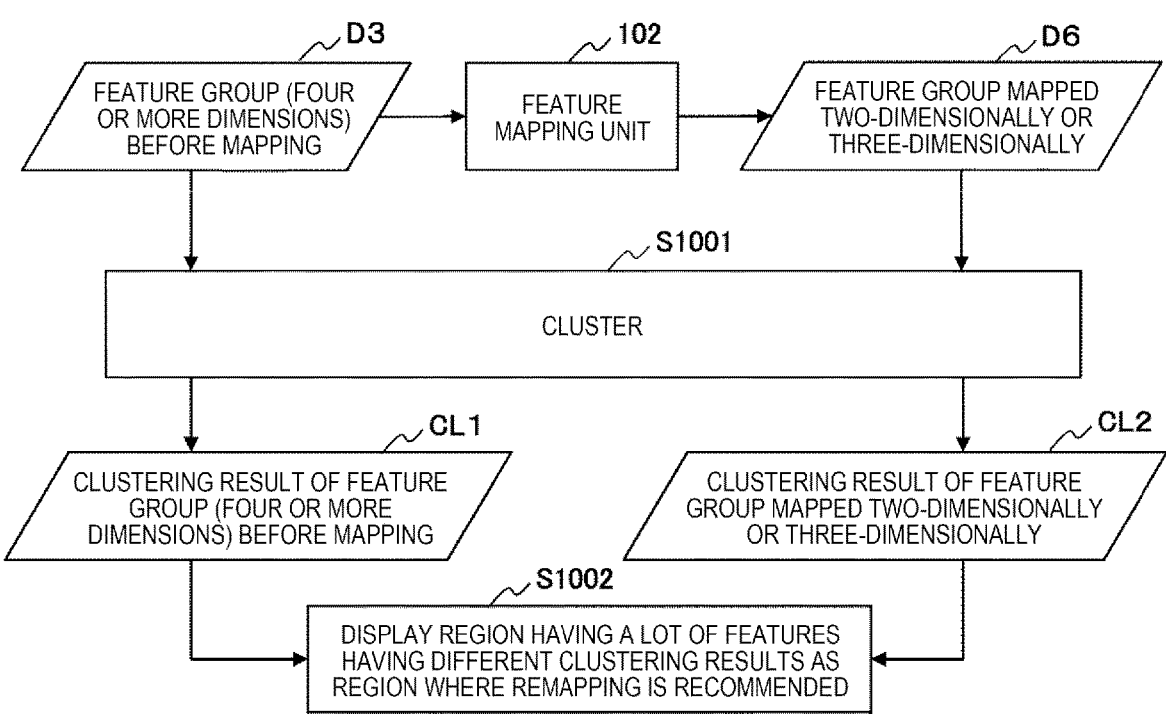

IMAGE CLASSIFICATION DEVICE AND IMAGE CLASSIFICATION METHOD

TECHNICAL FIELD

The present invention relates to an image classification device and an image classification method, and more particularly to a technique for reducing cost of creating training data in an image classification system having a training function.

BACKGROUND ART

An image classification system having a training function may be implemented using an image classification model such as deep learning. When using the image classification model such as deep learning, a large number of input images and training information representing types of the images are required as training data, and when the amount of the data is large, cost thereof is enormous.

As a countermeasure therefor, features of the images are mapped in a form that can be checked by humans to support a training information creating task. For example, in PTL 1, efforts are being made to reduce man-hours by performing principal component analysis on an image group and displaying distribution of features which are mapped two-dimensionally or three-dimensionally for visualization and separated for each feature of an image.

CITATION LIST

Patent Literature

PTL 1: JP2019-66993A

SUMMARY OF INVENTION

Technical Problem

In PTL 1, the principal component analysis is performed on the image group and the features are mapped two-dimensionally or three-dimensionally, but the principal component analysis is a method in which an axis where variation between data is greatest is determined two-dimensionally or three-dimensionally and reduction is performed in the other dimensions. Therefore, the mapping is performed in a manner of capturing only large features within the image, and small features within the image are ignored. Therefore, such a method is not appropriate when important information is present in a small region within the image. Furthermore, in a case of an image group having a large variation between noises in pixel values, the noises may be taken as axes, and important information may be reduced.

In order to solve the problems described above, an object of the invention is to provide an image classification device and an image classification method by which an important feature can be extracted and mapped even in a case where important information is present in a small region in an image or in a case of an image group having a lot of noises.

Solution to Problem

In order to solve the problems described above, the invention provides an image classification device for performing image classification. The image classification device has a configuration including: a feature extraction unit that generates a first image group generated by applying different noises to the same image among images included in an image group and a second image group including different images, that is trained such that features obtained from the first image group are approximate, that is trained such that features obtained from the second image group are more different, and that extracts features; a feature mapping unit that maps the extracted plurality of features two-dimensionally or three-dimensionally using manifold learning; and a display unit that displays a training information application task screen on which a mapping result is displayed and a training information application task is performed.

In order to solve the problems described above, the invention provides an image classification method for performing image classification. The image classification method includes: generating a first image group generated by applying different noises to the same image among images included in an image group and a second image group including different images, performing training such that features obtained from the first image group are approximate, performing training such that features obtained from the second image group are more different, and extracting features; mapping the extracted plurality of featured data two-dimensionally or three-dimensionally using manifold learning; and displaying a mapping result on a training information application task screen.

Advantageous Effects of Invention

According to the invention, it is possible to capture a small region within an important image as an important feature, perform feature extraction robust to noise, and perform mapping two-dimensionally or three-dimensionally. Accordingly, it is possible to support appropriate training data creation and reduce the number of man-hours required to improve accuracy of an image classification model.

BRIEF DESCRIPTION OF DRAWINGS

FIG. 1 is a diagram illustrating an example of an image classification device according to Embodiment 1.

FIG. 2 is a diagram illustrating an example of an overview of a processing procedure of a feature extraction unit.

FIG. 3 is a diagram illustrating an example of a learning processing procedure of an image classification model that implements the feature extraction unit.

FIG. 4 is a diagram illustrating examples of types of noise application in processing step S303 in FIG. 3.

FIG. 5 is a diagram illustrating an example of selecting a region on a training information application task screen and applying training information all at once.

FIG. 6 is a diagram illustrating an example of displaying thumbnail images on the training information application task screen.

FIG. 7 is a diagram illustrating an example of a screen emphasizing and displaying, on the training information application task screen, regions in each of which a plurality of features are concentrated and are well separated from other features.

FIG. 8 is a diagram illustrating an example of a screen emphasizing and displaying, on the training information application task screen, features that are isolated compared to other features.

FIG. 9 is a diagram illustrating an example of a screen on which a region to be remapped is specified on the training information application task screen.

FIG. 10 is a diagram illustrating an example of a processing procedure for determining a region where remapping is recommended.

DESCRIPTION OF EMBODIMENTS

Hereinafter, embodiments of the invention will be described in detail with reference to the accompanying drawings.

Embodiment 1

Embodiment 1 is an embodiment of an image classification device and a method therefor. The image classification device has a configuration including: a feature extraction unit that generates a first image group generated by applying different noises to the same image among images included in an image group and a second image group including different images, that is trained such that features obtained from the first image group are approximate, that is trained such that features obtained from the second image group are more different, and that extracts features; a feature mapping unit that maps the extracted plurality of features two-dimensionally or three-dimensionally using manifold learning; and a display unit that displays a training information application task screen on which a mapping result is displayed and a training information application task is performed.

FIG. 1 shows a configuration example of an image classification device according to Embodiment 1. The image classification device according to the embodiment includes a feature extraction unit 101 that extracts a feature of an image included in an image group D2 using an image classification model D1, and a feature mapping unit 102 that maps a plurality of features D3 two-dimensionally or three-dimensionally, and a display unit 103 that displays a training information application task screen. The image classification device displays a feature distribution diagram obtained by correctly separating each feature, thereby achieving an efficient training information application task. The feature extraction unit 101 and the feature mapping unit 102 can be implemented by executing predetermined functional processing programs on a normal central processing unit (CPU).

The feature extraction unit 101 includes a feature extractor 101-1 for an image classification model and a dimension reducer 101-2 that reduces dimensions in stages. The number of dimensions of features output by the feature extractor for the image classification model used in deep learning may be one thousand or more, and important features may be reduced due to large differences in the number of dimensions when directly inputting the features into the feature mapping unit 102 and mapping the features two-dimensionally or three-dimensionally. Therefore, the dimensions are reduced in stages using the dimension reducer 101-2. At this time, the plurality of features D3 have dimensions the number of which is equal to or less than the number of dimensions output by the feature extractor, and equal to or more than four. Here, the dimension reducer can be implemented using a neural network or the like. The feature mapping unit 102 can be implemented using mapping using manifold learning, for example.

The image classification model D1 may or may not be a model that is desired to be trained after training information is applied. The received image group D2 includes an image group to which training information is applied and an image group to which no training information is applied. Here, the training information indicates a class of an object mainly shown in an image. At this time, images in the image group to which no training information is applied may be images that are not classified into any of classes of the image group to which training information is applied. Furthermore, for the images in the image group to which no training information is applied, a size of the image group to which training information is applied does not matter.

FIG. 2 shows an example of processing by the feature extraction unit 101 in FIG. 1. In processing step S201, the feature extractor 101-1 and the dimension reducer 101-2 of the image classification model D1 are trained using the image group D2. In processing step S202, the trained feature extractor 101-1 is used to extract a feature of the image group and the trained dimension reducer 101-2 is used to reduce the dimensions, and the feature is output.

FIG. 3 is a diagram illustrating an example of a procedure of a method for training the feature extraction unit 101 of the image classification model D1. The feature extraction unit 101 simultaneously performs two types of training on the feature extractor D1-1 of the image classification model D1.

One is training using training information, and in processing step S301, supervised learning of the feature extractor 101-1 and the dimension reducer 101-2 is performed using the image group to which training information is applied.

The other training is performed without using training information, and is shown in processing step S302 and subsequent steps. In processing step S302, a plurality of images are acquired from the image group D2 and divided into one image D4 and a second image group D5, which is an image group including images other than the image D4. At this time, the number of images to be acquired is two or more, and the number of images in the second image group D5 is one or more.

In processing step S303, a plurality of patterns of noises are applied to the one image D4 to the extent that a class of an object shown in the image does not change, and a plurality of images are generated to form a first image group D6. In processing step S304, the training is performed such that features of the first image group D6 generated from the one image D4 are approximate, and in processing step S305, the training is performed such that features of the second image group D5 including a plurality of different images are more different.

Processing step S304 can be achieved by, for example, evaluating similarity between the features of the first image group using cosine similarity or the like and performing training such that the similarity increases. Processing step S305 can be similarly achieved by performing training such that the similarity decreases. An average value of a Euclidean distance may be used to evaluate the similarity, and a method is not limited.

FIG. 4 shows examples of different noises applied in processing step S303. Examples of applying noises to an image IM0 of a moon are shown in an image IM1, an image IM2, an image IM3, and an image IM4. In the image IM0, pixels in a non-moon part are present more than pixels in the moon in the image. Therefore, in terms of mapping using principal component analysis, in an image group of the moon included in the image group, the mapping may be performed using fluctuations in the non-moon part as principal components.

Geometric noises are applied to the image IM1, image IM2, and image IM3. The image IM1 is an example in which a noise that crops some random region of the image IM0 is added. At this time, it is desirable that the region to be cropped has a size such that the pixels of the moon are included as much as possible. The image IM2 is an example in which the image IM0 is horizontally reversed. The image IM3 is an example in which the image IM0 is rotated 90 degrees clockwise, and a rotation angle is not limited. By generating a plurality of such images and performing training in processing step S304, it is possible to train that the pixels (for example, a cloud shape) in the non-moon part that have a lot of fluctuations between different images are not important compared to the pixels in the moon.

The image IM4 is an example in which a random value is added to each pixel of the image IM0. By generating a plurality of such images and performing training in processing step S304, it is possible to train that variations in pixel values due to noise are not important features. In processing step S304, the noises shown in FIG. 4 may be combined, and a plurality of images can be generated by randomly combining the noises.

FIG. 5 shows an example of a screen on which a region of feature distribution shown on the training information application task screen of the display unit 103 is specified and training information is applied at once. A user can check the feature distribution and apply the training information to a plurality of well-separated features as Class 1 by specifying the region.

FIG. 6 shows an example of a screen on which image thumbnails are displayed at positions where images are distributed according to the feature distribution displayed on the training information application task screen of the display unit 103. By presenting the thumbnails to the user, correctness of the feature distribution can be easily checked, and the training information can be efficiently applied.

FIG. 7 shows an example of emphasizing and displaying regions in each of which a plurality of features are concentrated and are well separated from other features according to the feature distribution shown on the training information application task screen of the display unit 103. As an example of a method for determining a region to be emphasized and displayed, a plurality of features mapped using X-means or the like are clustered, and a region of a cluster having small cluster separation and a large distance from other clusters is emphasized. The distance here can be attained using a Euclidean distance or the like.

FIG. 8 shows an example of a screen emphasizing and displaying features that are isolated compared to other features according to the feature distribution displayed on the training information application task screen of the display unit 103. As an example of a method for determining a feature to be emphasized and displayed, a point having a large distance from neighboring features is emphasized.

Here, when the number of features distributed within a certain distance from a target feature is small, the target feature may be determined as a feature to be emphasized, or when an average distance between the target feature and other features is large, the target feature may also be determined as a feature to be emphasized.

FIG. 9 shows an example of a screen on which a region to be remapped is specified according to the feature distribution displayed on the training information application task screen of the display unit 103. Among the plurality of mapped features, a plurality of features that are well separated and have little variations, and a plurality of features that are not well separated and have a lot of variations may be displayed. In this case, by performing remapping by a feature remapping unit using only the plurality of features having a lot of variations, it becomes possible to display the plurality of features that are well separated and have little variations.

FIG. 10 shows an example of a processing procedure for determining a region where remapping is recommended. A clustering result CL1 of the plurality of the features D3 outputted by the feature extraction unit is compared with a clustering result CL2 of the plurality of two-dimensional or three-dimensional features D6 outputted by the feature mapping unit 102, and a region having a lot of features having different results is displayed as a region to be remapped (S1002).

A plurality of features before mapping are clustered using X-means or the like, and a plurality of features mapped two-dimensionally or three-dimensionally are similarly clustered to obtain respective clustering results CL1 and CL2. The most features in a cluster to which the plurality of features before mapping corresponding to a plurality of features in a post-mapping cluster i belong are defined as those in a pre-mapping cluster i. The number of features that are not in the pre-mapping cluster i among the plurality of features corresponding to the post-mapping cluster i is calculated, and when the number exceeds a threshold, a region of the pre-mapping cluster i is displayed as a region where remapping is recommended.

According to the invention described above, it is possible to capture a small region within an important image as an important feature, perform feature extraction robust to noise, and perform mapping two-dimensionally or three-dimensionally. Accordingly, it is possible to support appropriate training data creation and reduce the number of man-hours required to improve accuracy of an image classification model.

The invention is not limited to the above-described embodiments, and includes various modifications. For example, the above-described embodiments are described in detail for a better understanding of the invention, and the invention is not necessarily limited to those including all the configurations described above. Furthermore, although the above-described configurations, functions, and the like are described mainly using an example of creating a program for implementing some or all of the configurations, functions, and the like, some or all of the configurations, functions, and the like can also be implemented in hardware by, for example, being designed with an integrated circuit. That is, all or some of the functions of the processing unit may be implemented by, for example, an integrated circuit such as an application specific integrated circuit (ASIC) or a field programmable gate array (FPGA) instead of a program.

REFERENCE SIGNS LIST 101 feature extraction unit
102 feature mapping unit
103 training information application task screen
104 remapping
105 remapping result

The invention claimed is:
1. An image classification device for performing image classification, the image classification device comprising:
    a feature extraction unit that generates a first image group generated by applying different noises to the same image among images included in an image group and a second image group including different images, that is trained such that features obtained from the first image group are approximate, that is trained such that features obtained from the second image group are more different, and that extracts features;

a feature mapping unit that maps the extracted plurality of features two-dimensionally or three-dimensionally using manifold learning; and a display unit that displays a training information application task screen on which a mapping result is displayed and a training information application task is performed.

2. The image classification device according to claim 1, wherein the feature extraction unit includes a dimension reduction unit that is trained using training information in order to avoid deterioration in mapping accuracy due to the manifold learning when the number of dimensions of the extracted features is large.

3. The image classification device according to claim 1, wherein on the training information application task screen, a plurality of features included in a specified region are remapped and displayed.

4. The image classification device according to claim 1, wherein on the training information application task screen, a feature having a long distance from a neighboring point among the mapped plurality of features is emphasized and displayed.

5. The image classification device according to claim 1, wherein on the training information application task screen, a region in which a distribution density of features among the mapped plurality of features is high is emphasized and displayed.

6. The image classification device according to claim 1, wherein on the training information application task screen, image thumbnails are displayed at positions where the plurality of features are mapped.

7. The image classification device according to claim 1, wherein on the training information application task screen, training information is to be applied to the mapped plurality of features at once by selecting a region on a map.

8. The image classification device according to claim 1, wherein on the training information application task screen, a clustering result of the plurality of features output by the feature extraction unit and a clustering result using two-dimensional coordinates or three-dimensional coordinates output by the feature mapping unit are compared, and a region to be remapped is displayed when the results are different.

9. An image classification method for performing image classification, the image classification method comprising:

generating a first image group generated by applying different noises to the same image among images included in an image group and a second image group including different images, performing training such that features obtained from the first image group are approximate, performing training such that features obtained from the second image group are more different, and extracting features;

mapping the extracted plurality of features two-dimensionally or three-dimensionally using manifold learning; and displaying a mapping result on a training information application task screen.

10. The image classification method according to claim 9, wherein dimensions are reduced and output in order to avoid deterioration in mapping accuracy due to the manifold learning when the number of dimensions of the extracted features is large.

11. The image classification method according to claim 9, wherein on the training information application task screen, a clustering result of the plurality of features and a clustering result using two-dimensional coordinates or three-dimensional coordinates are compared, and a region to be remapped is displayed when the results are different.

* * * * *